United States Patent

Matsubara et al.

Patent Number: 5,200,255
Date of Patent: Apr. 6, 1993

[54] MAGNETIC RECORDING MEDIUM SUBSTRATE COMPRISING AN AROMATIC IMIDE POLYMER FILM AND INORGANIC FILLER PARTICLES

[75] Inventors: Kenji Matsubara; Akinori Ohtani; Toshiyuki Nishino; Kazuhiko Yoshioka, all of Ube, Japan

[73] Assignee: Ube Industries, Ltd., Yamaguchi, Japan

[21] Appl. No.: 385,063

[22] Filed: Jul. 26, 1989

[30] Foreign Application Priority Data

Jul. 29, 1988 [JP] Japan ............................ 63-188124

[51] Int. Cl.$^5$ ............................................... G11B 5/00
[52] U.S. Cl. ......................................... 428/212; 428/329; 428/330; 428/331; 428/402; 428/473.5; 428/694; 428/900
[58] Field of Search ............... 428/143, 145, 141, 694, 428/900, 473.5, 212, 402, 329, 330, 331

[56] References Cited

U.S. PATENT DOCUMENTS

| | | | |
|---|---|---|---|
| 4,781,965 | 11/1988 | Hashimoto et al. | 428/143 |
| 4,839,217 | 6/1989 | Tabata et al. | 428/156 |
| 4,910,068 | 3/1990 | Takagi et al. | 428/141 |

Primary Examiner—Paul J. Thibodeau
Assistant Examiner—Stevan A. Resan
Attorney, Agent, or Firm—Finnegan, Henderson, Farabow, Garrett and Dunner

[57] ABSTRACT

An aromatic polyimide film useful as a face for a magnetic recording material having a back face-side half stratum thereof containing principal filler fine particles which provide a low friction back face-side surface having a centerline average surface roughness of 2 to 10 m μm, and a front face-side half stratum thereof free from the principal filler particles and optionally containing additional filler fine particles having a size of 0.05 to 0.7 time that of the principal filler particles in a concentration of 0.1 to 0.8 time that of the principal filler particles, which additional filler particles provide a high smoothness front face-side surface having a centerline average surface roughness (Ra) of 0.1 to 0.8 time that of the back face-side surface, is produced from a first aromatic polyamic acid solution containing the principal filler particles and a second aromatic polyamic acid solution free from the principal filler particles and optionally containing the additional filler particles, by forming a film-shaped composite solution stream consisting of a first film-shaped solution stream united with a second film shaped solution stream, solidifying the film-shaped composite solution stream, and heat treating the solidified film to convert the polyamic acid to a corresponding polyimide.

17 Claims, 3 Drawing Sheets

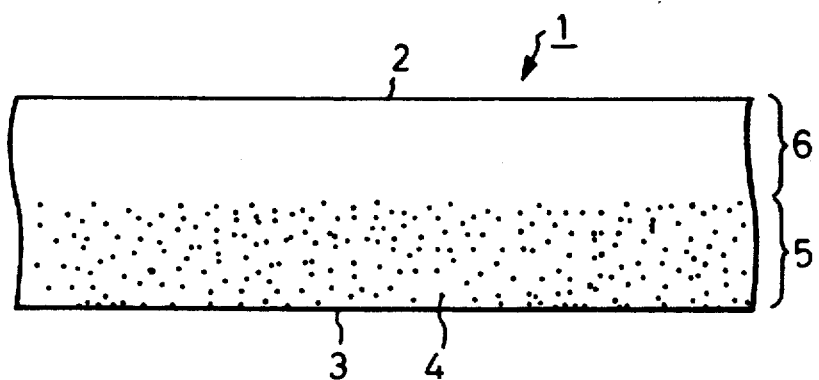
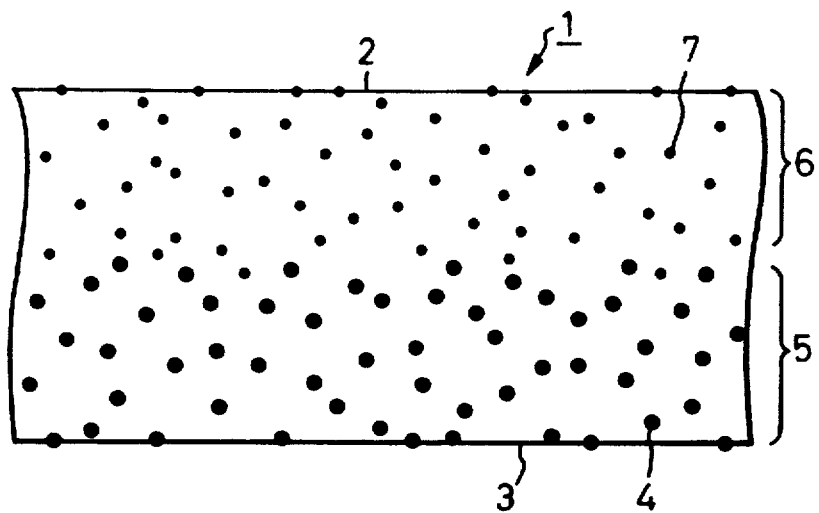

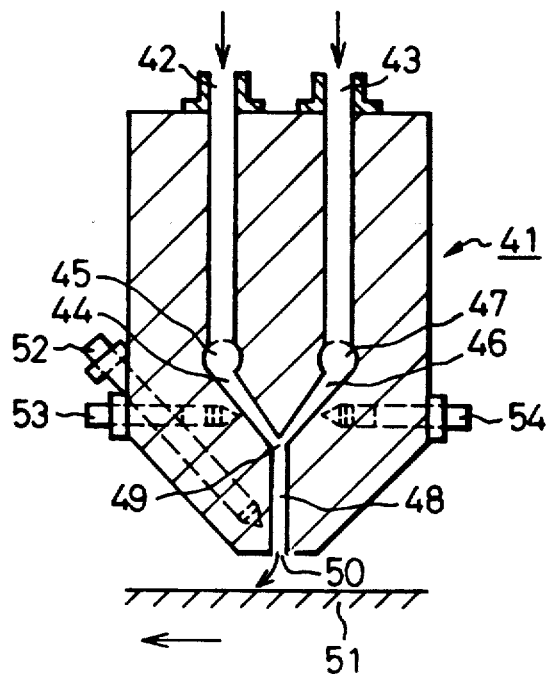
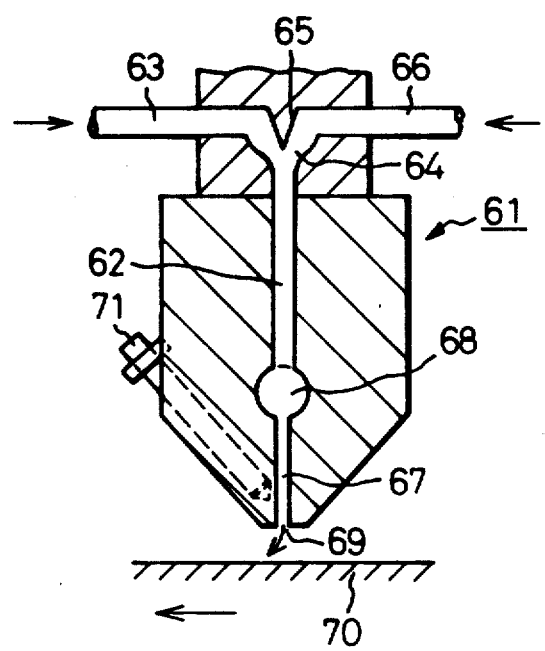
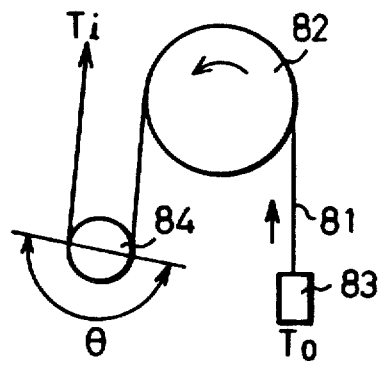

MAGNETIC RECORDING MEDIUM SUBSTRATE COMPRISING AN AROMATIC IMIDE POLYMER FILM AND INORGANIC FILLER PARTICLES

BACKGROUND OF THE INVENTION

1. Field of the Invention

The present invention relates to an aromatic imide polymer film for a magnetic recording material and a process for producing the same.

More particularly, the present invention relates to an aromatic imide polymer film having a front face-side surface having a relatively high surface smoothness, which is suitable for forming a magnetic recording layer thereon, and a back face-side surface having a high sliding property, which is useful as a heat resistant base film for a magnetic recording material, and a process for a producing the same with a high productivity.

2. Description of the Related Art

It is known that aromatic imide polymer films have a high mechanical strength and an excellent heat resistance and thus are useful as a base film on which a magnetic layer consisting of, for example, a Co-Cr alloy is formed by a vacuum vapor-depositing method or a sputtering method.

The conventional aromatic imide polymer film however, does not have satisfactory sliding properties, and an attempt was made to provide a sliding film containing an inorganic lubricant or filler therein and having a number of fine convexities formed on the surfaces thereof. In this type of sliding film, however, the two surfaces thereof were roughened by a number of fine convexities formed thereon due to the inorganic filler particles, and thus when a magnetic layer is formed on one surface of the film, the resultant magnetic recording sheet cannot stably exhibit a satisfactory output for a magnetic recording.

In another attempt at solving this problem, Japanese Examined Patent Publication (KokOku No. 55-2193 discloses a method of producing an aromatic polyimide film having a coating layer consisting of another polymer formed on one surface of the film. In this method, a surface of a polyamic acid film is coated with a solution of another polymer to form a two layer composite polyimide film.

In still another attempt, Japanese Unexamined Patent Publication (Kokai) No. 63-29700 discloses a method in which a surface of a polyimide film is coated with a solution of a polymer containing fine particles of a lubricant, and the resultant solution layer is dried and heat treated to provide a coating layer having an enhanced sliding property.

Nevertheless, this type of method of producing a high sliding coating layer on a surface of a polyimide film is disadvantageous in that undesirable impurities contaminate the coating layer; the resultant coating layer is very thin and thus cannot make smooth the surface of the polyimide film having a number of connexities formed thereon; the resultant coated film is frequently curled upon bending; and the resultant coated film exhibits an unsatisfactory smoothness on the opposite surface thereof.

Under the above-mentioned circumstances, there is a need for an aromatic imide polymer having a high sliding surface and a smooth surface thereof, which is useful as a base sheet for a magnetic recording material, and a process for producing the same with a high reproductivity.

SUMMARY OF THE INVENTION

An object of the present invention is to provide an aromatic imide polymer film having an easily sliding surface and a highly smooth surface, which is useful as a base sheet for a magnetic recording material, and a process for producing the same by a simple operation at a high reproductivity.

The above-mentioned object can be attained by an aromatic imide polymer film which comprises a film, having front and back face-side surfaces, consisting essentially of an aromatic imide polymer and a number of fine particles of a principal inorganic filler dispersed only in the back face-side half stratum of the film, the back face-side surface having a number of fine convexities formed thereon due to the principal filler particles and exhibiting a coefficient of static friction of 0.2 to 0.6.

The front face-side half stratum of the film is free from the principal filler particles and, optionally, contains a number of fine particles of an additional inorganic filler dispersed therein in a lower concentration than that of the principal filler particles and with a smaller average size than that of the principal filler particles, to cause the front face-side surface to be slightly roughened and to exhibit a low centerline average surface roughness lower than that of the back face-side surface.

The above-mentioned aromatic imide polymer film can be produced by the process of the present invention, which comprises the steps of introducing, in a film-forming die, a first dope solution comprising an aromatic polyamic acid dissolved in an organic solvent and a number of fine particles of a principal inorganic filler dispersed therein, into a uniting passage through a first film-forming passage in which the first dope solution is formed into a film-shaped stream;

simultaneously with the above step, introducing a second dope solution comprising an aromatic polyamic acid dissolved in an organic solvent and free from the principal filler particles, into the uniting passage through a second film-forming passage in which the second dope solution is formed into a film-shaped stream of the second dope solution;

uniting, in the uniting passage, the film-shaped first and second dope solution streams to form one film-shaped composite stream;

extruding the composite stream through a film-forming slit onto a smooth surface of a revolving support;

solidifying the resultant composite stream on the revolving support by evaporating the organic solvent to provide a solid film;

delivering the solid film from the revolving support; and heat treating the solid film to convert the aromatic polyamic acid in the solid film to a corresponding aromatic imide polymer and to completely remove the organic solvent from the solid film.

In the above-mentioned process, the second dope solution may further comprise a number of fine particles of an additional inorganic filler.

BRIEF DESCRIPTION OF THE DRAWINGS

FIGS. 1 and 2, are cross-sectional views of embodiments of an aromatic imide polymer film of the present invention;

FIG. 4 is an explanatory cross-sectional view of a two-layer film extrusion die for producing the aromatic imide polymer film of the present invention;

FIG. 5 is an explanatory cross-sectional view of another two-layer film extrusion die for producing the aromatic imide polymer film of the present invention; and FIG. 6 briefly shows a constitution of a tester for measuring a post friction coefficient of a film.

DESCRIPTION OF THE PREFERRED EMBODIMENTS

Figure 3:
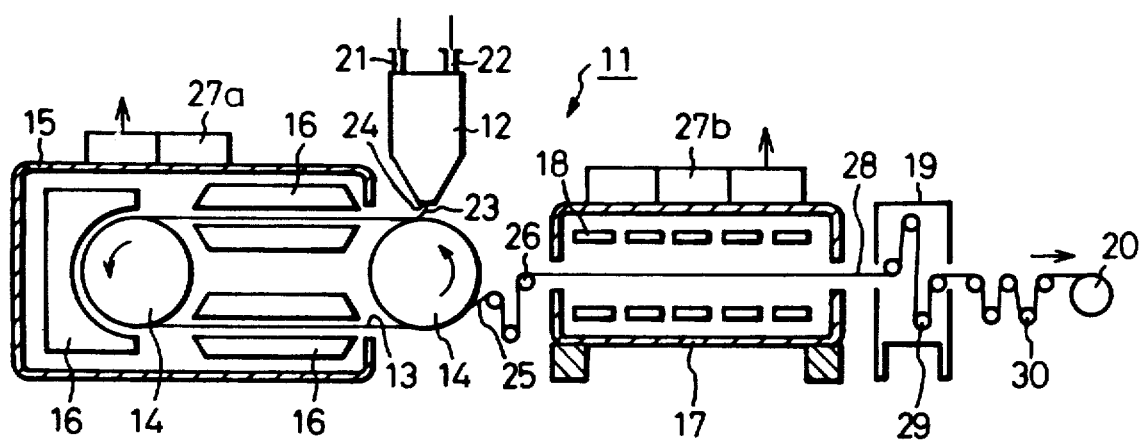
FIG. 3 is an explanatory cross-sectional view of an embodiment of the apparatus for effecting the process for producing the aromatic imide polymer film of the present invention.

FIG. 1 shows a microscopic cross-sectional view of an aromatic imide polymer film of the present invention.

Referring to FIG. 1, an aromatic imide polymer film 1 has a front face-side surface 2 on which a magnetic recording layer is to be formed and a back face side surface 3 opposite to the front face-side surface 2 and contains a number of fine particles 4 of a principal inorganic filler dispersed only in the back face-side half stratum 5 of the film. In the film 1, the front face side half stratum 6 is free from the principal filler particles 4.

The front face-side half stratum 6 is closely united with the back face-side half stratum 5 without boundary or border to form one body of film.

In FIG. 2, the film 1 has a front face-side half stratum 6 containing a number of fine particles 7 of an additional inorganic filler dispersed therein and a back face-side half stratum 5 containing a number of fine particles 4 of the principal inorganic filler dispersed therein. The front and back face-side half stratums are closely united with each other without boundary, to form one body of film.

The film of the present invention consists essentially of an aromatic imide polymer which is a polymerization-imidization product of an aromatic tetracarboxylic acid component with an aromatic diamine component and has a high resistance to heat and chemicals and a satisfactory mechanical strength.

The aromatic tetracarboxylic acid component preferably comprises at least one member selected from the group consisting of biphenyl tetracarboxylic acids, for example, 3,3',4,4'-biphenyltetracarboxylic acid and 2,3,3',4'-biphenyltetracarboxylic acid; pyromellitic acid; and benzophenonetetracarboxylic acids, for example, 3,3'4,4'-benzophenonetetracarboxylic acid, and dianhydrides, esters, and salts of the above-mentioned acids.

The aromatic diamine component preferably comprises at least one member selected from the group consisting of diaminodiphenyl ethers for example, 4,4'-diaminodiphenylether aminodiphenylether and 3,4'-diaminodiphenylether; diaminodiphenylsulfones, for example, 4,4'-diamino-diphenylsulfone and 3,4'-diaminodiphenylsulfone; and phenylene diamines, for example, o-, m-, and p-phenylene diamine.

A preferable aromatic imide polymer is prepared by polymerizing, in an organic solvent, an aromatic tetracarboxylic acid component containing at least 50 molar %, preferably at least 60 molar %, of at least one biphenyltetracarboxylic acid or dianhydride thereof with an aromatic diamine component containing at least 50 molar %, preferably at least 60 molar %, of at least one phenylene diamine, in an equimolar ratio, to provide an aromatic polyamic acid, and after a film is formed from the polyamic acid, by converting the aromatic polyamic acid to a corresponding aromatic imide polymer.

The resultant aromatic imide polymer film exhibits a satisfactory mechanical strength, heat resistance, and dimensional stability.

Another preferable aromatic imide polymer is prepared from an aromatic tetracarboxylic acid component comprising 50 molar % or more, preferably 55 to 90 molar %, of at least one biphenyltetracarboxylic acid or dianhydride thereof and 50 molar % or less, preferably 10 to 45 molar %, of pyromellitic acid or dianhydride thereof and an aromatic diamine component comprising 50 molar % or more, preferably 55 to 95 molar %, of at least one phenylene diamine and 50 molar % or less, preferably 5 to 45 molar %, of at least one diaminodiphenylether, in an equimolar ratio, in the same manner as mentioned above. The resultant aromatic imide polymer also exhibits a satisfactory mechanical strength, heat resistance, and dimensional stability.

The principal inorganic filler to be dispersed in the back face-side half stratum of the film can be selected from conventional lubricant fillers in the form of fine particles and preferably comprises at least one member selected from the group consisting of silica, colloidal silica, titanium dioxide, calcium carbonate, magnesium oxide, and alumina.

The principal filler particles preferably have an average size of from 2 to 1,000 m $\mu$m, more preferably 5 to 500 m $\mu$m.

In an embodiment of the aromatic imide polymer film of the present invention as indicated in FIG. 1, the principal filler particles on the back face-side surface of the film are preferably in a distribution density of from $1 \times 10^4$ to $5 \times 10^7$ particles/mm$^2$, more preferably 5 $\times 10^4$ to $1 \times 10^7$ particles/mm$^2$.

Also, the aromatic imide polymer film of the present invention preferably has a total thickness of from 2 to 200 $\mu$m, more preferably from 5 to 150 $\mu$m, still more preferably 6 to 60 $\mu$m, and a ratio in thickness in $\mu$m of the back face-side half stratum to the front face-side half stratum of 0.1:1 to 10:1, more preferably 0.15:1 to 8:1, most preferably 0.2:1 to 5:1

The fine particles of the principal filler dispersed in the back face-side half stratum cause a number of fine convexities to be formed on the back face-side surface of the film, and the roughened back face-side surface exhibits a low coefficient of static friction of from 0.2 to 0.6, preferably 0.25 to 0.5, and has a high centerline average surface roughness (Ra) of more than 2 m $\mu$m.

The front face-side surface of the film, which is free from the principal filler particles, preferably exhibits a centerline average surface roughness (Ra) of 2 m $\mu$m or less, more preferably 0.8 to 1.9 m $\mu$m, most preferably 1.0 to 1.8 m $\mu$m, and is a highly smooth surface.

The fine convexities on the back face-side surface preferably have an average height of from 3 to 50 m $\mu$m, more preferably 4 to 30 m $\mu$m. An average diameter the bases of the convexities is from 10 m $\mu$m or more, more preferably 10 to 500 m $\mu$m.

In the aromatic imide polymer film of the present invention, the low friction back face-side surface exhibits a high sliding property and thus contributes to enhancement of the slid-forwarding property of the film. The front face-side surface exhibits a high smoothness, and thus effectively allows the provision thereon of a magnetic recording layer having an excellent recording property.

In another embodiment of the aromatic imide polymer film of the present invention, the principal filler particles have an average size of from 40 to 200 m μm, preferably 40 to 100 m μm, and are in an amount of 0.5% to 5.0%, preferably 0.5% to 3%, based on the total weight of the back face-side half stratum.

In the above-mentioned embodiment, the aromatic imide polymer film is preferably provided with a front face-side half stratum containing a number of fine particles of an additional inorganic filler dispersed therein and having an average size of 1/20 to 7/10 of more preferably 7/10 to 6/10 of time that of the principal filler particles.

The additional filler particles preferably have an average size of 50 m μm or less, more preferably from 10 to 45 m μm, most preferably from 20 to 40 m μm.

The front face-side half stratum containing the additional filler particles effectively allows the formation thereon of a magnetic recording layer having an excellent magnetic recording property and an enhanced durability.

The fine particles of the additional filler on the front face-side surface are preferably in a distribution density of $1 \times 10^4$ to $5 \times 10^7$ particles/mm$^2$, more preferably $5 \times 10^4$ to $1 \times 10^7$ particles/mm$^2$.

In the aromatic imide polymer film as indicated in FIG. 2, the total thickness of the film is preferably in the range of from 2 to 200 μm, more preferably 3 to 150 μm, most preferably 5 to 60 μm, and a ratio in thickness in μm of the back face-side half stratum to the front face-side half stratum is preferably from 0.1:1 to 10:1, more preferably 0.2:1 to 8:1, most preferably 0.3:1 to 5:1. The above-mentioned type of film usually exhibits a satisfactory flexibility and softness.

The additional filler can be selected from conventional inorganic lubricant fillers in the form of fine particles, for example, silica, colloidal silica, titanium dioxide, calcium carbonate, magnesium oxide, and alumina.

In a preferable embodiment of the aromatic imide polymer film of the present invention as indicated in FIG. 2, the back face-side surface exhibits a centerline average surface roughness (Ra) of 2 to 10 m μm, more preferably 2 to 5 m μm, and has a number of fine convexities having an average height of 10 to 50 m μm, more preferably 11 to 30 m μm. The front face-side surface exhibits a centerline average surface roughness (Ra) of 2/10 to 8/10 of, more preferably 2/10 to 6/10 of, that of the back face-side surface and has a number of fine convexities having an average height of 2/10 to 8/10 of, more preferably 2/10 to 6/10 of, that of the back face-side surface.

In a more preferable embodiment of the aromatic imide polymer film of the present invention, the front face-side surface exhibits a centerline average surface roughness (Ra) of 2.5 m μm or less, more preferably 1.0 to 2.3 m μm, and the fine convexities formed on the front face-side surface have an average height of 15.0 m μm or less, more preferably 2.0 to 12.0 m μm. This front face-side surface is very suitable for forming thereon a magnetic recording layer having an excellent magnetic recording property.

The aromatic imide polymer film of the present invention preferably exhibits a coefficient of static friction of 0.1 to 0.7, more preferably 0.2 to 0.6, when the front face-side surface is brought into contact with and rubbed against the back face-side surface of the film.

This type of film provides an improved handling and working property when forming a magnetic recording layer on the front face-side surface.

Also, the aromatic imide polymer film of the present invention has a low friction back face-side surface having a high sliding property and a highly smooth front face-side surface having a proper sliding property, and thus exhibits an enhanced forwarding property in a recording procedure and an excellent handling property in a processing procedure. Particularly, the front face-side half stratum containing the additional filler particles presents a suitable front face-side surface for providing thereon a magnetic metal layer having an excellent magnetic property and durability.

An embodiment of the aromatic imide polymer of the present invention comprises a film, having front and back face-side surfaces, consisting essentially of an aromatic imide polymer and a number of fine particles of a principal inorganic filler dispersed only in a back face-side half stratum of the film, in which film the back face-side surface has a number of convexities formed thereon due to the principal filler particles and bits a coefficient of static friction of 0.2 to 0.6, the principal filler particles and has a centerline average surface roughness (Ra) of 2 m μm or less Another embodiment of the aromatic imide polymer film of the present invention comprises a film having front and back face-side surfaces thereof consisting essentially of an aromatic imide polymer, a number of fine particles of a principal inorganic filler dispersed in a back face-side half stratum of the film, in a concentration of 0.5 to 5% based on the weight of the back face-side half stratum, and having an average size of 40 to 200 m μm, and a number of fine particles of an additional inorganic filler dispersed in a front face-side half stratum of the film, in a concentration of 1/10 to 8/10 of that of the principal filler particles and having an average size of 1/20 to 7/10 of that of the principal filler particles, wherein the back face-side surface has a centerline average roughness (Ra) of 2 to 10 m μm and is provided with a number of convexities formed thereon due to the principal filler particles and having an average height of 10 to 50 m μm, and the front face-side surface has a centerline average surface roughness (Ra) of 1/10 to 8/10 of that of the back face-side surface and is provided with a number of convexities formed thereon due to the additional filler particle and having an average height of 2/10 to 8/10 of that of the back face-side surface.

The aromatic imide polymer film of the present invention can be produced by using, for example, the apparatus as indicated in FIGS. 3, 4, and 5.

Referring to FIG. 3, an apparatus 11 for producing an aromatic imide polymer film of the present invention comprises a film-forming die 12, a revolving support 13 having a smooth surface and revolving around a pair of rolls 14, a drying furnace 15 provided with hot air blowers 16, a heat treating furnace 17 having a plurality of heaters 18, a cooling chamber 19, and a film-winder 20.

In the process of the present invention, a first dope solution comprising an aromatic polyamic acid dissolved in an organic solvent and a number of fine particles of a principal inorganic filler dispersed in the solution is introduced into the die 12 through an inlet 21. Simultaneously, a second dope solution comprising an aromatic polymeric acid dissolved in an organic solvent, being free from the principal filler particles and optionally containing a number of fine particles of an additional filler, is introduced into the die 12 through an inlet 22.

The first and second dope solutions in the die 12 are formed into film-shaped streams and are united into one film-shaped composite stream.

The composite stream 23 is extruded through a film-forming slit 24 onto the revolving support 13 in a manner such that the front face-side surface of the composite stream formed by the second dope solution comes into contact with the smooth upper surface of the revolving support 13. The revolving support 13 consists of, for example, an endless metallic belt having a smooth upper surface and revolving around a pair of rotating rolls 14.

The composite solution film 23 is introduced into the drying furnace 15 and solidified therein by blowing hot air onto the composite solution film 23 on the revolving support 13 through the hot air blowers 16 to provide a solid film 25. The drying furnace 15 is provided with an exhaust hole 27a. The solid film 25 is separated from the smooth surface of the revolving support 13 and introduced into the heat-treating furnace 17 through guide rolls 26 and is heat-treated by the heat from the heaters 18. The heat-treating furnace 17 is provided with an exhaust hole 27b. In the heat treatment, the polyamic acid is converted to the corresponding imide polymer and the solid film is fully dried.

The resultant aromatic imide polymer film 28 is then introduced into the cooling chamber 19 and cooled to room temperature (0° C. to 50° C.) while being forwarded through guide rolls 29. The cooled aromatic imide polymer film 28 is wound around a winder 20 through guide rolls 30.

The procedure of uniting the first and second dope solutions in the film-forming die will be further explained with reference to FIGS. 4 and 5.

Referring to FIG. 4, in a film-forming die 41, a first dope solution containing the principal filler particles is introduced into a first passage 42, and simultaneously, a second dope solution free from the principal filler particles and optionally containing the additional filler particles is introduced into a second passage 43. The stream of the first dope solution is introduced into a first film-forming passage 44 through a first manifold 45 to form a film-shaped stream. Also, the stream of the second dope solution is introduced into a second film forming passage 46 through a manifold 47 to form into a film-shaped stream.

The first and second film-shaped dope solution streams are introduced into a uniting passage 48 through a junction 49 and are united in a side-by-side combination relationship to form one film-shaped composite stream.

The thickness of the film forming passages 44 and 46 are adjusted to a predetermined values by control bolts 53 and 54.

The resultant composite stream consisting of the first and second dope solutions is extruded through a film-forming slit 50 onto a smooth surface of a support 51 moving in the direction indicated by an arrow in FIG. 4. The thickness of the uniting passage 48 is adjusted to a predetermined value by a control bolt 52.

In the film-forming dye 61, a first dope solution is introduced into a uniting passage 62 through a first passage 63 and a junction 64 having a partition 65, and a second dope solution is introduced into the uniting passage 62 through a second passage 66 and the junction 64. In the uniting passage 62, the first and second dope solution streams are united in a side-by-side relationship to form one composite stream.

The composite stream is introduced into a film-forming passage 67 through a manifold 68 and formed into a film-shaped two layer composite stream consisting of a thin layer of the first dope solution and a thin layer of the second dope solution.

The film-shaped composite stream is extruded through a film forming slit 69 onto a smooth surface of a revolving support 70. The thickness of the film-forming passage 67 is adjusted to a predetermined value by a control bolt 71.

The first dope solution is prepared by dissolving an aromatic polyamic acid in an organic solvent to provide a solution and dispersing fine particles of principal inorganic filler in the solution.

The aromatic polyamic acid is in a concentration of 5 to 40% by weight, preferably 10 to 30% by weight, in the first dope solution, and the principal filler is in an amount of 0.1 to 5% by weight, preferably 0.3 to 3% by weight, based on the weight of the aromatic polyamic acid.

The second dope solution is prepared by dissolving an aromatic polyamic acid in an organic solvent to provide a solution and optionally contains fine particles of an additional filler dispersed in the solution.

In the second dope solution, the aromatic polyamic acid is in a concentration of 5 to 40% by weight, preferably 10 to 30% by weight, and optionally, the additional filler is in an amount of 0.1 to 5% by weight, preferably 0.3 to 3% by weight, based on the weight of the aromatic polyamic acid.

The aromatic polyamic acid in the first dope solution may be the same as or different from that in the second dope solution, but preferably the aromatic polyamic acids in the first and second dope solutions are the same.

The first and second dope solutions are united to form one film-shaped two layer composite solution stream in the above-mentioned manner and extruded through a film-forming slit.

At the temperature at which the composite solution stream is extruded through the film-forming slit, each of the first and second dope solutions preferably has a rotation viscosity of from 50 to 10,000 poises, more preferably 100 to 6,000 poises.

The aromatic polyamic acids in the first and second dope solutions preferably exhibits a logarithmic viscosity of 0.5 to 6, more preferably 1.0 to 5, most preferably 1.5 to 4, determined in a solvent consisting of N-methyl-2-pyrrolidone in a concentration of 0.5 g/100 ml at a temperature of 30° C.

The organic solvent usable for the first and second dope solutions preferably comprises at least one member selected from, for example, the group consisting of N-methyl-2-pyrrolidone, N,N-dimethylacetamide, N,N-diethylacetamide, N,N-dimethylformamide, and N,N-diethylformamide.

In the process of the present invention, the film-shaped two-layer composite solution stream is preferably extruded at a temperature of from 0° C. to 150° C., more preferably 5° C. to 100° C., most preferably 10° C. to 60° C. and the extruded composite solution stream is solidified on the revolving support by evaporating away the solvent preferably at a temperature of 100° C. to 180° C., more preferably 120° C. to 160° C., for 1 to 60 minutes, more preferably 5 to 30 minutes.

In the two-layer composite solution stream, the thickness of the first and second dope solution layers can be controlled by controlling the feed rates of the first and second dope solutions to the film-forming die.

The solid film is heat treated preferably at a temperature of 250° C. to 600° C., more preferably 300° C. to 550° C., for 1 to 60 minutes, more preferably 2 to 30 minutes, to completely remove the organic solvent from the solid film and to convert the aromatic polyamic acids in the film to corresponding aromatic imide polymers.

In each continuous process of the present invention, the resultant aromatic imide polymer film is continuously taken up by a winder at a winding speed of 0.1 to 10 m/min, preferably 0.2 to 5 m/min.

EXAMPLES

The present invention will be further explained by the following examples.

In the examples, the following tests were carried out.

1. The centerline average surface roughness (Ra) of a specimen was determined by using a Talystep surface roughness tester with a touching needle provided with a touching face having a length of 2.5 μm and a width of 0.2 μm, under a load of 2 mg at a roughness direction magnification of 200,000 to 500,000 at a measurement length of 1 mm.

2. The number of fine convexities on a surface was determined by taking a picture of a surface of a specimen with an microscopic camera at a magnification of 5,000 or more, preferably 10,000, and by counting the number of convexities observed in the picture and having a diameter of base thereof of 10 m μm or more.

3. The average height of convexities of a surface of a specimen was determined in such a manner that the above-mentioned microscopic picture of the specimen was subjected to a shadowing treatment at an angle of illumination, the lengths of shadows of the convexities were measured by the treated picture, and the heights of the convexities were calculated from the length of the shadow and the angle of illumination applied to the convexities.

4. The coefficient of friction of one specimen against another specimen, which corresponds to the handling property of the specimen, was determined by rubbing a front face-side surface of a specimen with a back face-side surface of another specimen and measuring the coefficient of static friction ($\mu s$) and the coefficient of dynamic friction ($\mu k$) of the specimen in accordance with ASTM D 1894.

5. The coefficient of post friction ($\mu$) of a specimen, which corresponds to the practical handling or forwarding property of the specimen, was determined in the following manner.

Referring to FIG. 6 showing a post friction coefficient tester, a test piece of a film 81 was wound on a free rotating roll 82 having a diameter of 20 mm, and an end of the test piece 81 was loaded at a load ($T_o$) of 27 g by fixing a weight 83 thereto. The other end portion of the test piece 81 was wound around a fixed frictional pin 84 at a contact angle ($\theta$) of 180 degrees. The test piece 81 was forwarded in the direction shown by an arrow in FIG. 6 at a tensile speed of 100 mm/min, and force ($T_i$) applied to the test piece 81 was measured.

The post friction coefficient ($\mu$) of the test piece was calculated in accordance with the following equation.

$$\text{Post friction coefficient } (\mu) = \frac{\ln(T_i/T_o)}{\theta}$$

6. The electromagnetic transformation property of the specimen was determined as follows.

A magnetic layer consisting of a Co-Cr alloy was formed on a front face-side surface of a tape-shaped aromatic imide polymer film of the present invention by a sputtering method to provide a magnetic recording tape (VTR tape). A record was made in the tape by applying a recording current. When the recording was reproduced, a signal S containing a video demodulation signal and noise N were measured by using a video noise meter. A ratio S/N was calculated and an electromagnetic transformation property (dB) was calculated from the ratio S/N.

The same recording material as that mentioned above was prepared except that a conventional simple layer aromatic imide polymer film having two surfaces thereof having a high sliding (low frictional) property was used. The electromagnetic transformation property of the resultant comparative VTR tape was represented by "0 dB".

7. The pass durability of the magnetic recording material was determined in the following manner.

A magnetic recording tape for a VTR was subjected to repeated operations in a VHS tape VTR or 8 mm VTR at a high temperature of 40° C. and a high relative humidity of 80%. The number of operations until abrasion or a defect was created on the magnetic recording face of the tape was counted. The pass durability of the magnetic recording tape was represented by the counted number of the operations.

EXAMPLE 1

An aromatic tetracarboxylic acid component consisting of 50 molar % of 3,3',4,4'-biphenyltetraconsist carboxylic dianhydride and 50 molar % of pyromellitic dianhydride in an amount of 50 parts by mole was mixed with 50 parts by mole of an aromatic diamine component consisting of 70 molar % of p-phenylene diamine and 30 molar % of 4,4'-diaminodiphenylether.

The resultant monomer mixture in an amount of 100 parts by weight was dissolved in 18 parts by weight N,N-dimethylacetamide. The solution was further mixed with colloidal silica particles having an average size of 45.0 m μm in an amount (PHR) of 1% based on the total weight of the monomer components.

The resultant mixture was subjected to a polymerization procedure at a temperature of 30° C. to provide a first dope solution containing 18% by weight of the resultant aromatic polyamic acid dissolved in N,N-dimethylacetamide and 1% by weight of the colloidal silica particles dispersed in the solution. The first dope solution exhibited a rotation viscosity of 5000 poises at a temperature of 30° C.

A second dope solution was prepared in the same manner as mentioned above except that no colloidal silica was used.

The second dope solution contained 18% by weight of an aromatic polyamic acid dissolved in N,N'-dimethylacetamide and had a rotation viscosity of 5,000 poises at 30° C.

The first and second dope solutions were fed at the same rate to the two-layer film-forming apparatus indicated in FIG. 3 and provided with a two-layer film-extruding die 41 indicated in FIG. 4.

In the die 41 of FIG. 4, the first and second dope solutions were united to form a two-layer composite solution stream and extruded through a slit 50 at a temperature of 30° C. Referring to FIG. 3, the extruded solution stream 23 was received on a smooth surface of the revolving support 13 and solidified in the drying furnace 15 by blowing hot air at a temperature of about 140° C. for 6 minutes. The resultant solid (self-supporting) film 25 containing 40% by weight of the organic solvent was peeled from the support surface and introduced into the heat treating furnace 17. In this furnace, the solid film was heat treated stepwise at a temperature of about 150° C. to 450° C. for 4 minutes.

The resultant aromatic imide polymer film 28 was cooled to room temperature in the cooling chamber 19 and then wound up at a take-up speed of 0.6 m/min by a winder 20.

The heat-treated aromatic imide polymer film had a thickness of 10 μm.

When a cross-sectional profile of the film was observed by an electron microscope, it was found that the colloidal silica particles were locally distributed only in the back face-side half stratum of the film as shown in FIG. 1. The back face-side half-stratum containing the colloidal silica had a thickness of about 5 μm. Also, the front face-side half-stratum free from the colloidal silica had a thickness of about 5 μm.

The aromatic imide polymer film exhibited a tensile strength of 34 kg/mm$^2$ and an ultimate elongation of 50%.

The results of the tests applied to the film are shown in Table 1.

EXAMPLE 2

The same procedures as in Example 1 were carried out except that, in the first dope solution, the colloidal silica particles had an average size of 60 m μm and an amount of 2.0% based on the total weight of the monomer components.

The first dope solution exhibited a rotation viscosity of 5,000 poises at 30° C.

The resultant aromatic imide polymer solid film had a thickness of 10 μm and exhibited a tensile strength of 35 kg/mm$^2$ and an ultimate elongation of 51%.

It was confirmed by electron microscopic observation of the cross-section of the film that each of the front and back face-side half stratums had a thickness of 5 μm.

The test results are shown in Table 1.

EXAMPLE 3

The same procedures as those disclosed in Example 1 were carried out except that the ratio of the feed rate of the first dope solution to the second dope solution was 1:4.

The resultant aromatic imide polymer film had a thickness of 10 μm and exhibited a tensile strength of 38 kg/mm$^2$ and an ultimate elongation of 55%.

It was confirmed by electron microscopic observation that in the cross-section of the film, the back face-side half stratum containing the colloidal silica particles had a thickness of 2 μm and the front face-side half stratum free from the colloidal silica particles had a thickness of 8 μm.

The test results are shown in Table 1.

COMPARATIVE EXAMPLE 1

The same aromatic polyamic acid solution as the second dope solution was converted to an aromatic imide polymer film having a thickness of 10 μm by a conventional single-layer film-forming process.

The test results for the comparative film are shown in Table 1.

COMPARATIVE EXAMPLE 2

The same aromatic polyamic acid solution containing the colloidal silica particles as the first dope solution was converted to an aromatic imide polymer film having a thickness of 10 μm by a conventional single layer film-forming process.

The test results of the comparative film are shown in Table 1.

TABLE 1

| Item | Example No. | | Example 1 | Example 2 | Example 3 | Comparative Example 1 | Comparative Example 2 |
|---|---|---|---|---|---|---|---|
| Principal filler particle | Type | | Colloidal silica | Colloidal silica | Colloidal silica | None | Colloidal silica |
| | Average size (m μm) | | 45 | 60 | 45 | — | 45 |
| | Amount (PHR) wt % | | 1.0 | 2.0 | 1.0 | — | 1.0 |
| Surface condition | Number of convexities per mm$^2$ | Back face-side | $5 \times 10^6$ | $5 \times 10^6$ | $5 \times 10^6$ | <10 | $5 \times 10^6$ |
| | | Front face-side | <10 | <10 | <10 | <10 | $5 \times 10^6$ |
| | Centerline average surface roughness (Ra) (m μm) | Back face-side | 2.3 | 3.0 | 2.2 | 1.7 | 2.3 |
| | | Front face-side | 1.7 | 1.8 | 1.6 | 1.7 | 2.3 |
| | Average height of convexities (m μm) | Back face-side | 13.0 | 18.0 | 13.5 | <10.0 | 13.0 |
| | | Front face-side | <10.0 | <10.0 | <10.0 | <10.0 | 13.0 |
| Handling property | Post friction coefficient | Static (μs) | 0.5 | 0.4 | 0.5 | 0.94 | 0.51 |
| | | Dynamic (μk) | 0.3 | 0.3 | 0.3 | 0.44 | 0.28 |
| | Film surface to surface friction coefficient | Static (μs) | 0.6 | 0.4 | 0.6 | >1 | 0.6 |
| | | Dynamic (μk) | 0.6 | 0.4 | 0.6 | >1 | 0.6 |
| Electromagnetic transformation (dB) of magnetic recording layer on front face-side surface | | | 6.2 | 6.0 | 6.3 | 6.3 | 2.5 |
| Pass durability of magnetic recording material (times) | | | 20 | 20 | — | — | — |

EXAMPLE 4

The same procedures as in Example 2 were carried out except that the second dope solution was prepared in the presence of colloidal silica particles having an average size of 22.5 m μm in an amount (PHR) of 1.0% based on the total weight of the monomer components.

The resultant aromatic imide polymer film had a thickness of 10 μm and exhibited a tensile strength of 35 kg/mm² and an ultimate elongation of 50%.

The test results are shown in Table 2.

EXAMPLE 5

The same procedures as in Example 2 were carried out except that the second dope solution was prepared in the presence of colloidal silica particles having an average size of 25.5 m μm in an amount (PHR) of 1.0% based on the total weight of the monomer components.

The resultant aromatic imide polymer film had a thickness of 10 μm and exhibited a tensile strength of 35 kg/mm² and an ultimate elongation of 50%.

The test results are shown in Table 2.

COMPARATIVE EXAMPLE 3

The same procedures as those described in Example 4 were carried out except that the first dope solution contained colloidal silica particles having an average size of 25.5 μm in an amount (PHR) of 1.0% based on the total weight of the monomer component.

The resultant comparative aromatic imide polymer film had a thickness of 10 μm and exhibited a tensile strength of 35 kg/mm² and an ultimate elongation of 50%.

The test results are shown in Table 2.

COMPARATIVE EXAMPLE 4

The same procedures as those described in Example 1 were carried out except that the second dope solution was prepared in the presence of colloidal silica particles having a size of 45 m μm in an amount of 1.0% based on the total weight of the monomer components.

The resultant comparative aromatic imide polymer film had a thickness of 10 μm and exhibited a tensile strength of 35 kg/mm² and an ultimate elongation of 50%.

The test results are indicated in Table 2.

TABLE 2

| Item | Example No. | | Example 4 | Example 5 | Comparative Example 3 | Comparative Example 4 |
|---|---|---|---|---|---|---|
| Principal filler (First dope) | Type | | Colloidal silica | Colloidal silica | Colloidal silica | Colloidal silica |
| | Average size (m μm) | | 60.0 | 60.0 | 22.5 | 45.0 |
| | Amount wt % | | 2.0 | 2.0 | 1.0 | 1.0 |
| Additional filler (Second dope) | Type | | Colloidal silica | Colloidal silica | Colloidal silica | Colloidal silica |
| | Average size (m μm) | | 22.5 | 35.0 | 22.5 | 45.0 |
| | Amount wt % | | 1.0 | 1.0 | 1.0 | 1.0 |
| Surface condition | The number of convexities per mm² | Back face-side | $5 \times 10^6$ | $5 \times 10^6$ | $9 \times 10^6$ | $5 \times 10^6$ |
| | | Front face-side | $9 \times 10^6$ | $6 \times 10^6$ | $9 \times 10^6$ | $5 \times 10^6$ |
| | Centerline average surface roughness (Ra) (m μm) | Back face-side | 3.0 | 3.0 | 2.0 | 2.3 |
| | | Front face-side | 2.0 | 2.2 | 2.0 | 2.3 |
| | Average height of convexities (m μm) | Back face-side | 18.0 | 18.0 | <10.0 | 13.0 |
| | | Front face-side | >10.0 | 11.0 | <10.0 | 13.0 |
| Handling property | Post friction coefficient | Static (μs) | 0.7 | 0.6 | 0.7 | 0.5 |
| | | Dynamic (μk) | 0.4 | 0.3 | 0.4 | 0.3 |
| | Film surface to surface friction coefficient | Static (μs) | 0.4 | 0.4 | >1.0 | 0.6 |
| | | Dynamic (μk) | 0.4 | 0.4 | >1.0 | 0.6 |
| Electromagnetic transformation (dB) of magnetic recording layer on front face-side surface | | | 5.0 | 4.5 | 5.0 | 2.5 |
| Pass durability of magnetic recording material (times) | | | 50 | 100 | 50 | 150 |

As clearly shown in Tables 1 and 2, in the aromatic imide polymer film of the present invention, the back face-side surface exhibits a low friction (high sliding) property and effectively causes the resultant recording material to exhibit a high handling and forwarding property in a recording device, and the front face-side surface exhibits a high smoothness and contributes to the forming of a magnetic metallic recording layer having an excellent recording property. The magnetic metallic layer can be easily formed on the front face-side surface by a sputtering or vapor depositing method. Therefore, the aromatic imide polymer film of the present invention is useful as a base film for a magnetic recording material.

We claim:

1. An aromatic imide polymer film for a magnetic recording material, composing a film, hiving front and back face-side surfaces and corresponding front and back face-side half strata, consisting essentially of an aromatic imbibe polymer, particles of a principal inorganic filler dispersed in the back face-side half stratum of the film, in an amount of 0.5 to 5% based on the weight of the back face-side half stratum and having an average size of 40 to 200 m μm, and particles of an additional inorganic filler dispersed in a front face-side half stratum of the film, in a concentration of 1/10 to 8/10 of that of the principals filler particles and having an average size of 1/20 to 7/10 of that of the principal filler particles, wherein the back face-side surface has a centerline average surface roughness of 2 to 10 m μm and is provided with convexities formed thereon due to the principal filler particles and having an average height of 10 to 50 μm, and the front face-side surface has a centerline average surface roughness of 1/10 to 8/10 of that of the back face-side surface and is provided with convexities formed thereon due to the additional filler particles and having an average height of 2/10 to 8/10 of that of those of the back face-side surface.

2. The aromatic imide polymer film as claimed in claim 1, wherein the aromatic imide polymer is a polymerization-imidization product of an aromatic tetracarboxylic acid component with an aromatic diamine compound.

3. The aromatic imide polymer film as claimed in claim 2, wherein the aromatic tetracarboxylic acid component comprises at least one member selected from the group consisting of biphenyltetracarboxylic acids, pyromellitic acid, and benzophenonetetracarboxylic acids, and dianhydrides, esters, and salts of the above-mentioned acids.

4. The aromatic imide polymer film as claimed in claim 2, wherein the aromatic diamine component comprises at least one member selected from the group consisting of diaminodiphenylethers, diaminodiphenyl sulfones and phenylenediamines.

5. The aromatic imide polymer film as claimed in claim 2, wherein the aromatic tetracarboxylic acid compound comprises 50 molar % or more of at least one biphenyl tetracarboxylic dianhydride and 50 molar % or less of at least one other aromatic tetracarboxylic acid compound than biphenyl tetracarboxylic dianhydride and the aromatic diamine component comprises 50 molar % or more of at least one phenylene diamine.

6. The aromatic imide polymer film as claimed in claim 2, where the aromatic tetracarboxylic acid component comprises 50 molar % or more of at least one biphenyltetracarboxylic dianhydride and 50 molar % or less of at least one pyromellitic dianhydride; and the aromatic diamine component comprises 50 molar % or more of at least one phenylene diamine and 50 molar % or less of at least one diaminodiphenylether.

7. The aromatic imide polymer film as claimed in claim 1, wherein the principal filler comprises at least one member selected from the group consisting of silica, colloidal silica, titanium dioxide, calcium carbonate, magnesium oxide, and alumina.

8. The aromatic imide polymer film as claimed in claim 1, wherein the particles of the principal filler on the back face-side surface of the film are in a distribution density of $1 \times 10^4$ to $5 \times 10^7$ particles/mm$^2$.

9. The aromatic imide polymer film claimed in claim 1, the film has a thickness of 2 to 200 $\mu$m.

10. The aromatic imide polymer film as claimed in claim 1, wherein a ratio in thickness in $\mu$m of the back face-side half stratum containing the principal filler particles to the front face-side half stratum is from 0.1:1 to 10:1.

11. The aromatic imide polymer film as claimed in claim 1, wherein the convexities on the back face-side surface have an average height of from 10 to 50 m $\mu$m and an average diameter of the bases of the convexities is 10 m $\mu$m or more.

12. The aromatic imide polymer film as claimed in claim 1, wherein the back face-side surface has a centerline average surface roughness of more than 2 m $\mu$m.

13. The aromatic imide polymer film as claimed in claim 1, wherein the additional filler particles have an average size of 10 to 50 m $\mu$m.

14. The aromatic imide polymer film as claimed in claim 1, wherein the additional filler consists essentially of at least one member selected from the group consisting of silica, colloidal silica, titanium dioxide, calcium carbonate, magnesium oxide and alumina.

15. The aromatic imide polymer film as claimed in claim 1, wherein the centerline average surface roughness of the front face-side surface is 2.5 m $\mu$m or less.

16. The aromatic imide polymer film as claimed in claim 1, wherein the average height of the convexities on the front face-side surface is 15 m $\mu$m or less.

17. The aromatic imide polymer film as claimed in claim 1, wherein the back face-side surface exhibits a coefficient of static friction of 0.2 to 0.6.

* * * * *

UNITED STATES PATENT AND TRADEMARK OFFICE
CERTIFICATE OF CORRECTION

PATENT NO. : 5,200,255
DATED : April 6, 1993
INVENTOR(S) : Kenji Matsubara et al It is certified that error appears in the above-indentified patent and that said Letters Patent is hereby corrected as shown below:

Claim 1, col. 14, line 49, "composing" should read --comprising--; "hiving" should read --having--;

line 52, "imbibe" should read --imide--;

line 59, "principals" should read --principal--;

line 65, "50" should read --50 m--.

Claim 9, col. 16, line 8, "the film" should read --wherein the film--.

Signed and Sealed this

Eleventh Day of January, 1994

*Attest:*

BRUCE LEHMAN

*Attesting Officer*  Commissioner of Patents and Trademarks